United States Patent Office 2,870,188
Patented Jan. 20, 1959

2,870,188
PROCESS FOR THE MANUFACTURE OF PANTOTHENIC ACID 4′-PHOSPHATE AND ITS SALTS

Frank Ratcliffe Atherton, Welwyn Garden City, England, assignor to Hoffmann-La Roche Inc., Nutley, N. J., a corporation of New Jersey No Drawing. Application September 27, 1956
Serial No. 612,357

Claims priority, application Great Britain
October 3, 1955

6 Claims. (Cl. 260—461)

The present invention relates to a process for the manufacture of pantothenic acid 4′-phosphate and salts thereof.

According to the process provided by the invention, pantothenonitrile is treated with phenyl phosphorodichloridate in the presence of a tertiary base, the product hydrolysed with an alkaline-earth metal hydroxide and, if desired, the resulting alkaline-earth metal salt of pantothenic acid 4′-phosphate converted to the free acid or another salt.

The initial material, namely pantothenonitrile, may be obtained by leaving a mixture of pantolactone and β-amino-propionitrile to stand for a few days at normal temperatures or by the broadly similar method published by Shive and Snell [J. Biol. Chem., 1945, 160, 287].

The treatment with phenyl phosphorodichloridate should be carried out in the cold but the resulting mixture may then be gently warmed to complete the reaction. Pyridine is a suitable tertiary base for use in this step.

Preferably barium hydroxide is used for the hydrolysis step.

The alkaline-earth metal salt obtained in the hydrolysis step can be converted into the free acid by treatment with an acid or passage through a suitable ion-exchange resin or into other salts by treating the latter with the appropriate organic or inorganic base.

The process may be illustrated thus:

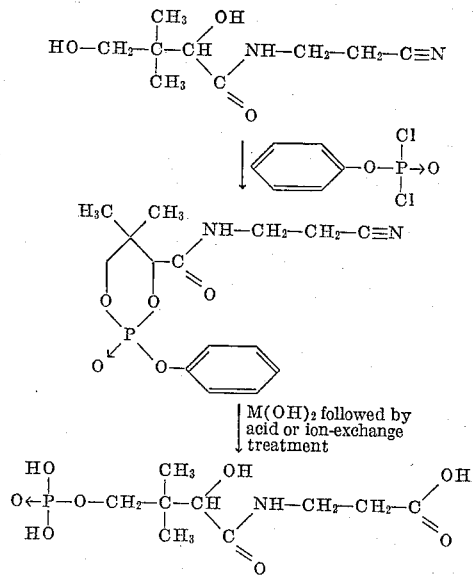

wherein M stands for an alkaline-earth metal atom.

It will be understood that the process may be carried out using the D- or L- or DL-form of the initial material and that a further step of optical resolution may be included therein.

The following example is given by way of illustration:

Example

D-pantothenonitrile (20 g., 0.1 M) was prepared from D-pantolactone (13 g., 0.1 M) and β-amino-propionitrile (7 g., 0.1 M) by keeping the mixture of these components for 4 days at ca. 20° C. The racemic nitrile has previously been obtained in a broadly similar manner by Shive and Snell [J. Biol. Chem., 1945, 160, 287].

The crude product was dissolved in dry pyridine (600 ml.) and the mixture stirred and cooled to −40° C. Phenyl phosphorodichloridate (22.2 g., 0.105 M) was then added in one portion, the mixture kept at −40° C. for 10 minutes, then allowed to warm up to ca. 20° C. and finally heated to 60°–70° C. for 4 hours before storing for 15 hours.

The base was removed by evaporation in vacuo, the residue was dissolved in chloroform (250 ml.) and the solution washed successively with water (150 ml.), sulphuric acid (2 x 100 ml. of 2-N), water (100 ml.), saturated potassium bicarbonate (100 ml.) and water (100 ml.). The solvent phase was then evaporated to dryness in vacuo and traces of chloroform removed by reevaporation with ethanol. The residue was then transferred with the aid of a little dioxane (35 ml.) into barium hydroxide solution (5000 ml. of 0.3-N) and the mixture was then heated under reflux with stirring for 3½ hours. Separated solid was removed by filtration and barium was removed by passing the filtrate through a column of Amberlite IR 120 in the hydrogen cycle [resin bed 5 cm. wide and 58 cm. high] the column being washed with water (3000 ml.) until free of acid. The effluent was concentrated in vacuo to small bulk (approximately 500 ml.) and phenol removed by extraction with ether (2 x 200 ml.); the aqueous phase was then adjusted to pH 8.5 with barium hydroxide solution (585 ml. of 0.36-N). This solution was concentrated in vacuo to small bulk (400 ml.), clarified by charcoal treatment and filtration and then concentrated to small bulk (200 ml.). On addition of ethanol (400 ml.) a heavy precipitate was formed. After 15 hours, the separated solid was filtered, washed with 80% ethanol, ethanol and acetone and was dried, ultimately over phosphorus pentoxide in vacuo.

The amount of barium D-pantothenic acid 4′-phosphate obtained using the quantities in parentheses amounted to 35.8 grams.

I claim:

1. A process for the manufacture of pantothenic acid-4′-phosphate which comprises treating pantothenonitrile with about an equimolar proportion of phenyl phosphorodichloridate in excess tertiary base in the cold at first and then warming, hydrolysing the phosphorylation product by heating with alkaline earth metal hydroxide and converting the salt thus obtained with an acidic agent to pantothenic acid-4′-phosphate.

2. A process for the manufacture of pantothenic acid-4′-phosphate which comprises treating pantothenonitrile with about an equimolar proportion of phenyl phosphorodichloridate in excess pyridine in the cold at first and then warming, hydrolysing the phosphorylation product by heating with barium hydroxide and converting the salt thus obtained with acid to pantothenic acid-4′-phosphate.

3. A process for the manufacture of pantothenic acid-4′-phosphate which comprises treating pantothenonitrile with about an equimolar proportion of phenyl phosphorodichloridate in excess pyridine in the cold at first and then warming, hydrolysing the phosphorylation product by heating with barium hydroxide and converting the salt thus obtained with an ion exchange resin on the hydrogen cycle to pantothenic acid-4′-phosphate.

4. A process for the manufacture of pantothenic acid-4'-phosphate which comprises treating pantothenonitrile with about an equimolar proportion of phenyl phosphorodichloridate in excess pyridine at about −40° C., heating the mixture to about 60 to 70° C., hydrolysing the phosphorylation product by heating with barium hydroxide and converting the salt thus obtained with sulfuric acid to pantothenic acid-4'-phosphate.

5. A process which comprises treating pantothenonitrile with about an equimolar proportion of phenyl phosphorodichloridate in excess tertiary base in the cold at first, then warming and hydrolysing the phosphorylation product by heating with alkaline earth metal hydroxide.

6. A process which comprises treating pantothenonitrile with about an equimolar proportion of phenyl phosphorodichloridate in excess pyridine at about −40° C., heating to about 60 to 70° C. and hydrolysing the phosphorylation product by heating with barium hydroxide.

References Cited in the file of this patent

FOREIGN PATENTS 164,585     Australia _____ Aug. 15, 1955